(12) United States Patent
Hyodo et al.

(10) Patent No.: US 10,698,279 B2
(45) Date of Patent: Jun. 30, 2020

(54) DISPLAY DEVICE

(71) Applicant: Japan Display Inc., Tokyo (JP)

(72) Inventors: Yosuke Hyodo, Tokyo (JP); Shinichiro Oka, Tokyo (JP); Lu Jin, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/984,913

(22) Filed: May 21, 2018

(65) Prior Publication Data

US 2018/0356701 A1 Dec. 13, 2018

(30) Foreign Application Priority Data

Jun. 7, 2017 (JP) .................................. 2017-112527

(51) Int. Cl.
| | |
|---|---|
| G02F 1/1333 | (2006.01) |
| G02F 1/1362 | (2006.01) |
| G02F 1/1343 | (2006.01) |
| G02F 1/1335 | (2006.01) |
| G02F 1/1368 | (2006.01) |

(52) U.S. Cl.
CPC ...... G02F 1/136286 (2013.01); G02F 1/1343 (2013.01); G02F 1/133305 (2013.01); G02F 1/133345 (2013.01); G02F 1/133512 (2013.01); G02F 1/133514 (2013.01); G02F 1/136209 (2013.01); G02F 2001/13685 (2013.01); G02F 2001/134372 (2013.01)

(58) Field of Classification Search
CPC ......... G02F 1/133345; G02F 1/136286; G02F 1/133305
See application file for complete search history.

(56) References Cited

U.S. PATENT DOCUMENTS

| | | | |
|---|---|---|---|
| 2014/0078458 A1* | 3/2014 | Fukushima | G02F 1/133305 349/158 |
| 2017/0059918 A1 | 3/2017 | Sasaki et al. | |
| 2017/0184897 A1* | 6/2017 | Rho | H01L 27/323 |

FOREIGN PATENT DOCUMENTS

| | | |
|---|---|---|
| JP | 2017-44714 A | 3/2017 |
| JP | 2017-44715 A | 3/2017 |

* cited by examiner

*Primary Examiner* — Michael H Caley
*Assistant Examiner* — Mariam Qureshi
(74) *Attorney, Agent, or Firm* — Michael Best & Friedrich LLP

(57) ABSTRACT

A display device including a first resin substrate having flexibility, a second resin substrate having flexibility facing the first resin substrate, an electro-optical layer between the first resin substrate and the second resin substrate, a semiconductor layer included in a transistor between the first resin substrate and the electro-optical layer, a plurality of wiring layers between the first resin substrate and the electro-optical layer, the plurality of wiring layers including a metal layer below the semiconductor layer, a first inorganic insulating layer between the metal layer and the first resin substrate, and a second inorganic insulating layer arranged in the second resin substrate between the electro-optical layer and the second resin substrate, a thickness of the second inorganic insulating layer being different from a thickness of the first inorganic insulating layer.

9 Claims, 12 Drawing Sheets

DISPLAY DEVICE

CROSS REFERENCE TO RELATED APPLICATIONS

This application is based upon and claims the benefit of priority from the prior Japanese Patent Application No. 2017-112527, filed on Jun. 7, 2017, the entire contents of which are incorporated herein by reference.

FIELD

One embodiment of the present invention is related to a display device. In particular, one embodiment of the present invention is related to a display device using a resin substrate having flexibility.

BACKGROUND

It is expected that flexible display devices will be widely applied as portable scroll type displays or screen type large screen display devices. The realization of flexible display devices is strongly desired as next-generation display devices which are lightweight and have excellent storage capabilities. Recently, research and development into the flexibility of display devices is actively being performed. The research and development of flexibility of a liquid crystal display device (Liquid Crystal Display device (LCD)) as well as flexibility of a display device such as an Organic Light-Emitting Diode (OLED) or electronic paper is advancing.

In order to make a flexible display device, it is necessary to form a flexible substrate above a glass substrate, form an element forming a display device such as transistors and capacitors above the flexible substrate, and after forming the elements, peel the glass substrate off the flexible substrate (see Japanese Laid Open Patent Publication No. 2017-44714 and Japanese Laid Open Patent Publication No. 2017-44715). A resin substrate is used as a flexible substrate.

As disclosed in Japanese Laid Open Patent Publication No. 2017-44714 and Japanese Laid Open Patent Publication No. 2017-44715, when elements are formed above a resin substrate formed on a glass substrate, internal stress may be generated in the resin substrate. When the glass substrate is peeled off from the flexible substrate in this state, a display cell becomes distorted by the internal stress of the flexible substrate. In particular, the display cell is greatly distorted in the case when the difference between the internal stress in an array substrate and the internal stress in an opposing substrate is large. When the display cell is distorted, appearance defects such as wrinkles and warping occur in the display device when an optical member is attached to the display cell.

SUMMARY

A display device in an embodiment according to the present invention includes a first resin substrate having flexibility, a second resin substrate having flexibility and facing the first resin substrate, an electro-optical layer between the first resin substrate and the second resin substrate, a semiconductor layer included in a transistor between the first resin substrate and the electro-optical layer, a plurality of wiring layers between the first resin substrate and the electro-optical layer, the plurality of wiring layers including a metal layer below the semiconductor layer, a first inorganic insulating layer between the metal layer and the first resin substrate, and a second inorganic insulating layer arranged in the second resin substrate between the electro-optical layer and the second resin substrate, a thickness of the second inorganic insulating layer being different from a thickness of the first inorganic insulating layer.

A display device in an embodiment according to the present invention includes a first resin substrate having flexibility, a second resin substrate having flexibility and facing the first resin substrate, an electro-optical layer between the first resin substrate and the second resin substrate, a transistor between the first resin substrate and the electro-optical layer, the transistor including a semiconductor layer above the first resin substrate and a gate electrode above the semiconductor layer, a first inorganic insulating layer between the semiconductor layer and the first resin substrate, and a second inorganic insulating layer arranged in the second resin substrate between the electro-optical layer and the second resin substrate, a thickness of the second inorganic insulating layer being different from a thickness of the first inorganic insulating layer.

DESCRIPTION OF EMBODIMENTS

Figure 1:
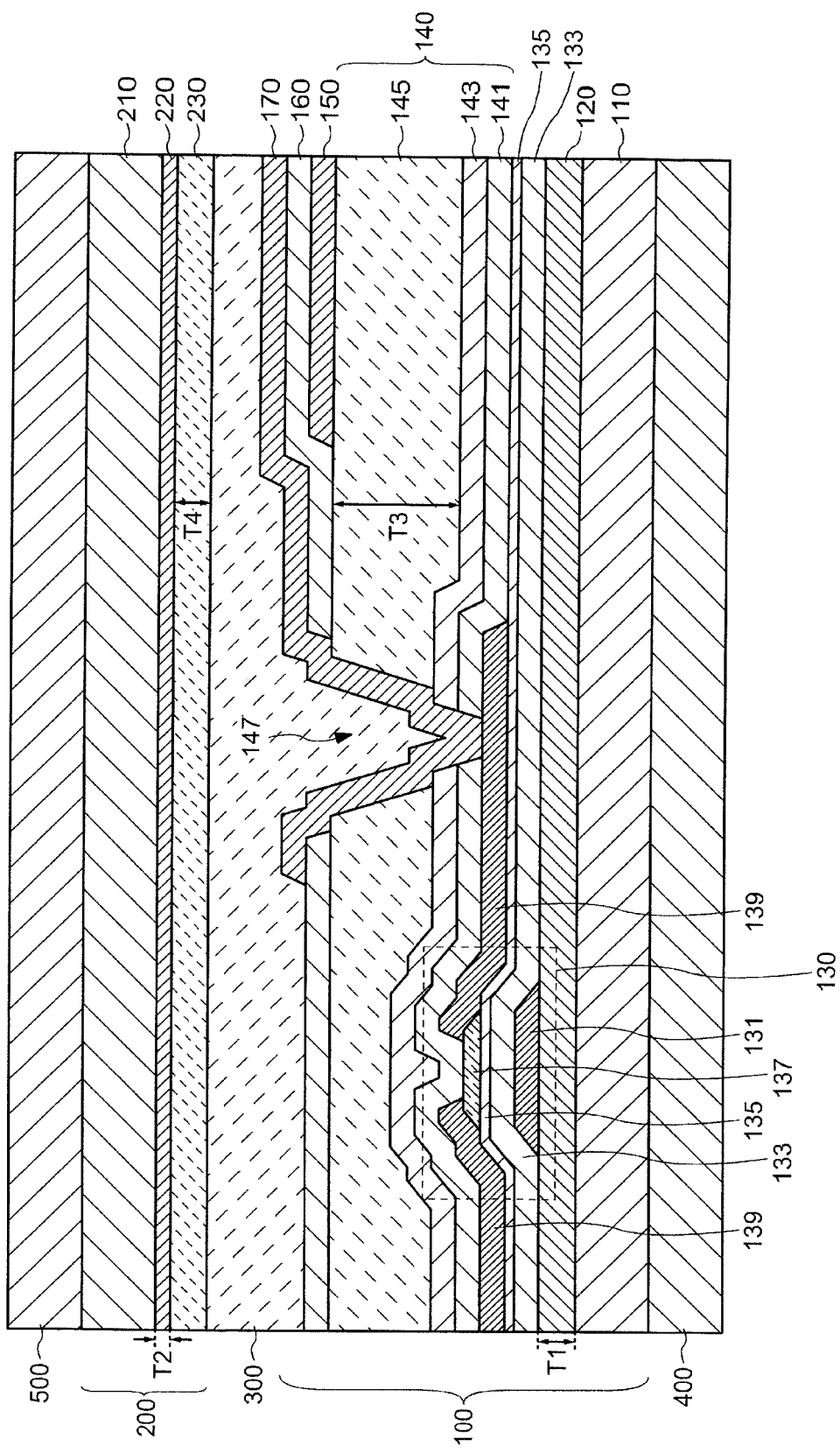
FIG. 1 is a diagram showing a cross-sectional structure of a liquid crystal display device related to one embodiment of the present invention.

The embodiments of the present invention are explained below while referring to the diagrams. Furthermore, the disclosure is merely an example, and those skilled in the art can of course easily conceive of changes in keeping with the concept of the invention which are included in the scope of the present invention. Although the width, thickness and shape of each component are shown schematically compared to their actual form in order to better clarify explanation, the drawings are merely an example and should not limit an interpretation of the present invention. In addition, in the present specification and each drawing, elements similar to those described with reference to the preceding drawings may be attached with the same reference symbols followed by a letter of the alphabet and a detailed explanation thereof may be omitted as appropriate.

In each embodiment of the present invention, a direction from an array substrate on which a transistor is arranged towards an opposing substrate opposed to the array substrate is referred to as above or upwards. Conversely, the direction from the opposing substrate to the array substrate is referred to as below or downwards. For the sake of convenience of explanation, an explanation is given using the phrases "upward" or "downward", but it may be arranged so that the vertical relationship between the array substrate and the opposing substrate is opposite to that shown in the drawing, for example. In the following explanation for example, the expression [the second member above (or "on") the first member] merely explains the vertical relationship between the first member and the second member as described above, and other members may be arranged between them.

[Display device] refers to a structure which displays an image using an electro-optical layer. For example, the term [display device] refers to a structure in which another optical member (for example, a polarization member, an illumination device, a touch panel, etc.) is attached to a display cell. Furthermore, the term [display cell] refers to an array substrate on which transistors are arranged, an opposing substrate and a structure including an electro-optical layer between these substrates. The [electro-optical layer] may include a liquid crystal layer, an electroluminescence (EL) layer, an electrochromic (EC) layer and an electrophoretic layer as long as no technical contradiction arises. Therefore, with respect to embodiments described herein, although a liquid crystal display device including a liquid crystal layer is explained as an example of a display device, the application to a display device including other electro-optical layers described above is not excluded.

In the present specification, the expressions [α includes A, B or C], [α includes any one of A, B, and C], and [α includes one selected from the group consisting of A, B and C] does not exclude the case where α includes a plurality of combinations of A to C unless otherwise specified. Furthermore, these expressions do not exclude the case where α includes other elements.

In view of the above circumstances, an object of one embodiment of the present invention is to provide a display device in which appearance defects are suppressed.

First Embodiment

An outline of a liquid crystal display device according to one embodiment of the present invention is explained while referring to FIG. 1 to FIG. 7. In the first embodiment, an example is explained in which a liquid crystal display device is used as a display device. However, the present invention can also be applied to a display device such as an organic EL device, electronic paper and the like in addition to the liquid crystal display device.

[Structure of Display Device 10]

FIG. 1 is a diagram showing a cross-sectional structure of a liquid crystal display device according to one embodiment of the present invention. As is shown in FIG. 1, the display device 10 includes an array substrate 100, an opposing substrate 200, a liquid crystal layer 300 (electro-optical layer), a first polarization member 400 and a second polarization member 500. At least the array substrate 100 and the opposing substrate 200 have flexibility. That is, the display device 10 is a flexible display device. The opposing substrate 200 faces the array substrate 100. The liquid crystal layer 300 is arranged between the array substrate 100 and the opposing substrate 200. In other words, the liquid crystal layer 300 is arranged between a first resin substrate 110 of the array substrate 100 described below and a second resin substrate 210 of the opposing substrate 200.

The first polarization member 400 is adhered under the array substrate 100 with an adhesive. The second polarization member 500 is adhered above the opposing substrate 200 with an adhesive. These adhesives that bond the polarization members and the substrates may have a water absorbing material or a waterproof material. The array substrate 100, the opposing substrate 200 and the liquid crystal layer 300 may also be referred to as display cells. As described above, it is possible to replace the liquid crystal layer 300 with another electro-optical layer such as an EL layer, an EC layer and an electrophoretic layer.

The array substrate 100 includes a first resin substrate 110, a first inorganic insulating layer 120, a transistor 130, an interlayer insulating layer 140, a common electrode 150, an insulating layer 160 and a pixel electrode 170. The first resin substrate 110 has flexibility. The transistor 130 includes a gate electrode 131, gate insulating layers 133 and 135, a semiconductor layer 137, and a source/drain electrode 139. The gate electrode 131 faces the semiconductor layer 137 below the semiconductor layer 137. The gate insulating layers 133 and 135 are arranged between the gate electrode 131 and the semiconductor layer 137. That is, the transistor 130 is a bottom gate type transistor. The interlayer insulating layer 140 includes inorganic insulating layers 141 and 143 and a first organic insulating layer 145.

The first inorganic insulating layer 120 is arranged above the first resin substrate 110. The transistor 130 is arranged above the first inorganic insulating layer 120. The interlayer insulating layer 140 is arranged above the transistor 130. The liquid crystal layer 300 is arranged above the interlayer insulating layer 140. In other words, the transistor 130 is arranged between the first resin substrate 110 and the liquid crystal layer 300. An opening part 147 is provided in the interlayer insulating layer 140 and the insulating layer 160. The opening part 147 expose a part of the source/drain electrode 139. The common electrode 150 is arranged above the interlayer insulating layer 140. The pixel electrode 170 is arranged above the common electrode 150 and the opening part 147. The pixel electrode 170 is connected to the source/drain electrode 139 via the opening part 147. The insulating layer 160 is arranged between the common electrode 150 and the pixel electrode 170. The insulating layer 160 electrically insulates the common electrode 150 from the pixel electrode 170. Although not shown in the diagram, an alignment film is arranged between the pixel electrode 170 and the liquid crystal layer 300.

In the present embodiment, although the first inorganic insulating layer 120 is in contact with the first resin substrate 110, they also may not be in contact with each other. The first inorganic insulating layer 120 is arranged between the metal layer (gate electrode 131) below the semiconductor layer 137 and the first resin substrate 110. In other words, the first inorganic insulating layer 120 is arranged between the wiring layer (gate electrode 131) closest to the first resin substrate among the plurality of wiring layers (including the gate electrode 131, the source/drain electrode 139, the common electrode 150 and the pixel electrode 170) included in the array substrate 100 and the first resin substrate 110. In the present embodiment, the metal layer under the semiconductor layer 137 corresponds to the gate electrode 131. However, the metal layer is not limited to the gate electrode 131. Similarly, in the present embodiment, the wiring layer closest to the first resin substrate 110 corresponds to the gate electrode 131. However, the metal layer is not limited to the gate electrode 131.

The first resin substrate 110 has tensile stress. The first inorganic insulating layer 120 has compressive stress. That is, the stress of the first inorganic insulating layer 120 is stress in a direction opposite to the stress of the first resin substrate 110. In the case where the first resin substrate 110 has compressive stress, the first inorganic insulating layer 120 has tensile stress. It is preferred that the compressive stress of the first inorganic insulating layer 120 is greater than the compressive stress of each of the [other inorganic insulating layers] arranged in the array substrate 100. It is preferred that a film density of the first inorganic insulating layer 120 is higher than a film density of the [other inorganic insulating layers] arranged in the array substrate 100. The first organic insulating layer 145 has tensile stress similar to the first resin substrate 110.

Specifically, as described above the [other inorganic insulating layers] given as a comparison object of the first inorganic insulating layer 120 corresponds to the inorganic insulating layer (third inorganic insulating layer) between the wiring layer (gate electrode 131) which is the closest to the first resin substrate 110 among the plurality of wiring layers included in the array substrate 100 and the wiring layer (pixel electrode 170) which is the closest to the liquid crystal layer 300. In FIG. 1, the insulating layers corresponding to the [other inorganic insulating layers] are the gate insulating layers 133 and 135, the inorganic insulating layers 141 and 143 and the insulating layer 160.

In the case when the first inorganic insulating layer 120 has a stacked structure, it is possible to interpret the stacked structure as a single body. That is, the average film density of the plurality of inorganic insulating films which form the stacked structure can be interpreted as the film density of the first inorganic insulating layer 120. Similarly, the total thickness of the plurality of inorganic insulating films which form the stacked structure can be interpreted as the thickness of the first inorganic insulating layer 120.

As is explained in detail below, since the first inorganic insulating layer 120 has stress in a direction opposite to that of the first resin substrate 110, it is possible to suppress distortion of the display cell when the first resin substrate 110 is peeled from a glass substrate. The first inorganic insulating layer 120 is in contact with the first resin substrate 110 and the compressive stress of the first inorganic insulating layer 120 is larger than the compressive stress of the other inorganic insulating layer so that the tensile stress of the first resin substrate 110 can be relieved. As a result, since an internal stress of the array substrate 100 can be reduced, it is possible to suppress the occurrence of appearance defects such as wrinkles and distortions of the display device 10.

The gate insulating layers 133 and 135 are inorganic insulating layers. The gate insulating layer 133 has a function for blocking impurities such as mobile ions and moisture. The gate insulating layer 135 is an insulating layer having a low defect level and good adhesion to the semiconductor layer 137 and the source/drain electrode 139. The inorganic insulating layer 141 is an insulating layer having a low defect level and good adhesion to the gate insulating layer 135, the semiconductor layer 137 and the source/drain electrode 139. The inorganic insulating layer 143 has a function for blocking impurities such as mobile ions and moisture. In the present embodiment, although a structure in which the gate insulating layers 133 and 135 are two layers is exemplified, the gate insulating layer may be one layer or three or more layers. Similarly, in this embodiment, although a structure in which the inorganic insulating layer of the interlayer insulating layer 140 has two layers is exemplified, the inorganic insulating layer may be one layer or three or more layers.

The gate electrode 131, the source/drain electrode 139, the common electrode 150 and the pixel electrode 170 are respectively wiring layers. That is, the display device 10 has a plurality of wiring layers. In other words, the plurality of wiring layers are arranged between the first resin substrate 110 and the liquid crystal layer 300. In the present embodiment, the gate electrode 131 and a wiring layer in the same layer as the gate electrode 131 is a wiring layer closest to the first resin substrate 110 among the plurality of wiring layers. Similarly, the pixel electrode 170 and a wiring layer in the same layer as the pixel electrode 170 is a wiring layer closest to the liquid crystal layer 300 among the plurality of wiring layers. In the present embodiment, the gate electrode 131 and the source/drain electrode 139 are made of metal. The common electrode 150 and the pixel electrode 170 are metal oxides (transparent conductive films). However, these wiring layers are only required to have conductivity and can be appropriately selected from metals, metal oxides, metal nitrides and metal carbides.

The common electrode 150 and the pixel electrode 170 are arranged at positions at least partially different from each other in a planar view. With this type of arrangement, in the case when a potential difference is generated between the common electrode 150 and the pixel electrode 170, an electric field in the horizontal direction (direction parallel to the main surface of the first resin substrate 110) is formed in the liquid crystal layer 300. That is, the display device shown in FIG. 1 is a lateral electric field drive type liquid crystal display device. The common electrode 150 and the pixel electrode 170 may partially overlap each other in a planar view.

The opposing substrate 200 includes a second resin substrate 210, a second inorganic insulating layer 220 and a second organic insulating layer 230. The second resin substrate 210 faces the first resin substrate 110 and has flexibility. The second inorganic insulating layer 220 is arranged under the second resin substrate 210. The second organic insulating layer 230 is arranged under the second inorganic insulating layer 220. The liquid crystal layer 300 is arranged under the second organic insulating layer 230. In other words, the second inorganic insulating layer 220 and the second organic insulating layer 230 are arranged between the second resin substrate 210 and the liquid crystal layer 300. In the present embodiment, although the second inorganic insulating layer 220 is in contact with the second resin substrate 210, they also may not be in contact with each other.

The second resin substrate 210 has tensile stress. The second inorganic insulating layer 220 has compressive stress. That is, the stress of the second inorganic insulating layer 220 is stress in a direction opposite to the stress of the second resin substrate 210. In the case where the second resin substrate 210 has compressive stress, the second inorganic insulating layer 220 has tensile stress. It is preferred that the compressive stress of the second inorganic insulating layer 220 is equivalent to the compressive stress of the first inorganic insulating layer 120. It is preferred that a film density of the second inorganic insulating layer 220 is equivalent to a film density of the first inorganic insulating layer 120. The second organic insulating layer 230 has tensile stress similar to the second resin substrate 210.

As is explained in detail below, since the second inorganic insulating layer 220 has stress in a direction opposite to that of the second resin substrate 210, it is possible to suppress distortion of the display cell when the second resin substrate 210 is peeled from a glass substrate. The second inorganic insulating layer 220 is in contact with the second resin substrate 210 and the compressive stress of the second inorganic insulating layer 220 is equivalent to the compressive stress of the first inorganic insulating layer 120 so that the tensile stress of the resin substrate 210 can be relieved more effectively. As a result, since an internal stress of the opposing substrate 200 can be reduced, it is possible to suppress the occurrence of appearance defects such as wrinkles and distortions of the display device 10.

The second inorganic insulating layer 220 has a stacked structure in which a plurality of insulating films are stacked. However, the second inorganic insulating layer 220 may also be a single layer. Although explained in detail below, the second organic insulating layer 230 includes a color filter layer, a light shielding layer, an overcoat layer and an alignment film. However, in the case where the color filter layer and the light shielding layer are arranged in the array substrate, the second organic insulating layer 230 corresponds to the alignment film.

A thickness T1 of the first inorganic insulating layer 120 is different from a thickness T2 of the second inorganic insulating layer 220. Since the layer structure of the array substrate 100 is different from the layer structure of the opposing substrate 200, internal stresses having different strengths are generated in each respective substrate. In the present embodiment, by adjusting T1 and T2, it is possible to reduce the difference between internal stresses of both substrates. In the present embodiment, the thickness T1 of the first inorganic insulating layer 120 is larger than the thickness T2 of the second inorganic insulating layer 220. Furthermore, in the present embodiment, a thickness T3 of the first organic insulating layer 145 is larger than a thickness T4 of the second organic insulating layer 230.

T1 and T2 are the thicknesses in a region where each of the lower layer films are flat and there are almost no variations in the thicknesses of the first inorganic insulating layer 120 and the second inorganic insulating layer 220. T3 is the thickness of the first organic insulating layer 145 in a region where it does not overlap with the gate electrode 131, the semiconductor layer 137 and the source/drain electrode 139 in a planar view. T4 is the thickness of the second organic insulating layer 230 in a region where a plurality of organic insulating layers overlap in a planar view when the second organic insulating layer 230 is formed of a plurality of organic insulating layers. In the case where the second organic insulating layer 230 is a single layer, T4 is the thickness in a region where each of the lower layer films are flat and there are almost no variations in the thicknesses of the second organic insulating layer 230.

The thickness T3 of the first organic insulating layer 145 between the first inorganic insulating layer 120 and the liquid crystal layer 300 affects the internal stress of the array substrate 100. The thickness T4 of the second organic insulating layer 230 between the second inorganic insulating layer 220 and the liquid crystal layer 300 affects the internal stress of the opposing substrate 200. Therefore, in the case when the thickness T3 of the first organic insulating layer 145 is larger than the thickness T4 of the second organic insulating layer 230, since the thickness T1 of the first inorganic insulating layer 120 is larger than the thickness T2 of the second inorganic insulating layer 220, the difference between the internal stress of the array substrate 100 and the internal stress of the opposing substrate 200 can be reduced.

In FIG. 1, although a structure of a lateral electric field drive type liquid crystal display device is exemplified as the display device 10, the structure is not limited to this structure. For example, in the display device 10, the common electrode 150 may be arranged on the opposite side (that is, the opposing substrate 200 side) of the pixel electrode 170 with respect to the liquid crystal layer 300, and the liquid crystal layer 300 may be a vertical electric field driving type liquid crystal display device which forms an electric field in the vertical direction (direction orthogonal to the main surface of the first resin substrate 110).

[Material of Each Member]

It is possible to use a material having transparency to light in the visible light region and having flexibility as the first resin substrate 110 and the second resin substrate 210. For example, a polyimide resin, acrylic resin, epoxy resin, silicone resin, fluororesin, siloxane resin, polyethylene terephthalate resin, polyethylene naphthalate resin, polyacrylonitrile resin, polymethyl methacrylate resin, polycarbonate resin, polyether sulfone resin, polyamide resin, cycloolefin resin, polystyrene resin, polyamide imide resin, polyvinyl chloride resin, and the like can be used as the first resin substrate 110 and the second resin substrate 210.

It is possible to use Silicon oxide (SiOx), silicon nitride (SiNx), aluminum oxide (AlOx), aluminum nitride (AlNx) or the like as the first inorganic insulating layer 120 and the second inorganic insulating layer 220 (x is an arbitrary positive number). The inorganic insulating layer descried above may be formed by a CVD method or a sputtering method.

It is possible to use SiNx, AlNx or the like as the gate insulating layer 133 and the inorganic insulating layer 143. It is possible to use SiOx, AlOx, or the like as the gate insulating layer 135 and the inorganic insulating layer 141. SiOx, SiNx, AlOx, AlNx or the like can be used as the insulating layer 160. An organic insulating layer similar to the first organic insulating layer 145 and the second organic insulating layer 230 described herein can be used as the insulating layer 160.

It is possible to use the same materials as the materials listed for the first resin substrate 110 and the second resin substrate 210 as the first organic insulating layer 145 and the second organic insulating layer 230.

It is possible to use aluminum (Al), titanium (Ti), chromium (Cr), cobalt (Co), nickel (Ni), zinc (Zn), molybdenum (Mo), indium (In), tin (Sn), hafnium (Hf), tantalum (Ta), tungsten (W), platinum (Pt), bismuth (Bi) or the like as the gate electrode 131 and the source/drain electrode 139. An alloy of these materials may be used, or oxides, nitrides, or carbides of these materials may be used as the gate electrode 131 and the source/drain electrode 139.

It is possible to use a metal oxide material such as ITO (indium tin oxide), IGO (indium gallium oxide), IZO (indium zinc oxide) or GZO (zinc oxide to which gallium is added as a dopant) as the common electrode 150 and the pixel electrode 170.

[Evaluation Method of Film Density of Inorganic Insulating Layer]

The film density of the inorganic insulating layer used as the first inorganic insulating layer 120 and the second inorganic insulating layer 220 is higher than the film density of the gate insulating layers 133 and 135, the inorganic insulating layers 141 and 143, and the insulating layer 160. The film density can be evaluated by analysis methods such as an X-ray Reflectometer (XRR), Rutherford Back-Scattering Spectroscopy (RBS) or by wet etching.

XRR is an analysis method in which X-rays are incident on a sample surface at an extremely shallow angle and an X-ray intensity profile reflected in the specular direction with respect to the incident angle is measured. It is possible to evaluate the film thickness and the film density of the sample by comparing the profile obtained by this analysis method with a simulation result. RBS is an analysis method in which a sample is irradiated with an ion beam and energy and intensity of ions scattered backward by Rutherford scattering is measured. It is possible to evaluate the film density based on the spectrum obtained by this measurement.

Wet etching is a method of evaluating film density from the etching rate. When the same type of films or films having substantially the same etching rate with respect to the same etchant used for the wet etching are relatively compared with each other, a material having a high film density has a lower etching rate than a material having a low film density. Therefore, it is possible to evaluate the magnitude relation between the relative film densities by comparing the etching rates. In particular, in the case of evaluating a multilayer structure, it is possible to etch a plurality of layers under the same conditions by processing the sample so that the cross section of the sample is exposed and performing wet etching processing on the processed sample. It is possible to evaluate the magnitude relation of the etching rate for a plurality of layers from the amount of etching advanced by this etching process.

[Structure of Second Inorganic Insulating Layer 220]

Figure 2:
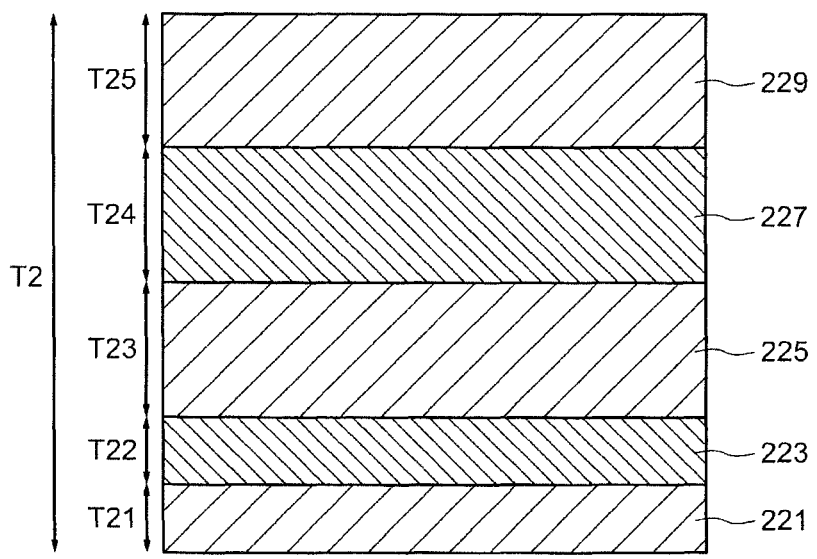
FIG. 2 is a diagram showing a layer structure of a second inorganic insulating layer in a liquid crystal display device related to one embodiment of the present invention.

A layer structure of the second inorganic insulating layer 220 is explained while referring to FIG. 2. FIG. 2 is a diagram showing a layer structure of a second inorganic insulating layer in a liquid crystal display device according to one embodiment of the present invention. As is shown in FIG. 2, the second inorganic insulating layer 220 includes a plurality of insulating films. Specifically, the second inorganic insulating layer 220 includes insulating films 221, 223, 225, 227, and 229.

In the example shown in FIG. 2, the insulating films 221, 225, 229 have the same main material, and the insulating films 223, 227 have the same main material. The main materials of the insulating films 221, 225, 229 are different from the main materials of the insulating films 223, 227. In the example of FIG. 2, the insulating films 221, 225, and 229 are formed from SiOx. The insulating films 223 and 227 are formed from SiNx. However, the materials of the insulating films 221, 223, 225, 227 and 229 are not limited to the above materials. A thickness of each of the insulating films 221, 225, and 229 which have the same main material may be different. In the example of FIG. 2, a thickness T21 of the insulating film 221 is smaller than thicknesses T23 and T25 of the insulating films 225 and 229. Similarly, thicknesses of the insulating films 223 and 227 which have the same main material may be different. In the example of FIG. 2, a thickness T22 of the insulating film 223 is smaller than a thickness T24 of the insulating film 227. Since the thicknesses of each of the insulating films are different as described above, stress of the second inorganic insulating layer 220 can be adjusted.

As described above, since the second inorganic insulating layer 220 has a stacked structure, the barrier properties of the second inorganic insulating layer 220 are improved.

As is shown in FIG. 2, in the case where the second inorganic insulating layer 220 has a stacked structure, it is possible to interpret the stacked structure as a single body. That is, the average film density of the plurality of inorganic insulating films which form the stacked structure can be interpreted as the film density of the second inorganic insulating layer 220. Similarly, the total thickness of the plurality of inorganic insulating films which form the stacked structure can be interpreted as the thickness of the second inorganic insulating layer 220.

As is described above, according to the display device 10 of the first embodiment, by adjusting the thickness of the first inorganic insulating layer 120 arranged in the array substrate 100 and the thickness of the second inorganic insulating layer 220 arranged in the opposing substrate 200 to different thicknesses, it is possible to reduce the difference between the internal stress of the array substrate 100 and the internal stress of the opposing substrate 200. As a result, it is possible to suppress appearance defects such as wrinkles and distortions of the display device 10. In particular, in the case when high transparency is required for both the first resin substrate 110 and the second resin substrate 210 as in a liquid crystal display device, the materials used for these resin substrates is limited. Therefore, it is difficult to adjust the internal stress of the array substrate 100 and the internal stress of the opposing substrate 200 by changing the material of both resin substrates, or increase the rigidity of these substrates by changing the material of both resin substrates. However, according to the structure of the first embodiment, even in such a case, it is possible to adjust the internal stress of both substrates.

[Manufacturing Method of Display Device 10]

A manufacturing method of the display device 10 is explained using FIG. 3 to FIG. 7. Each of FIG. 3 to FIG. 7 is a diagram showing a manufacturing method of a liquid crystal display device according to one embodiment of the present invention. In these diagrams, a structure is shown in which the structure shown in FIG. 1 is simplified. In FIG. 3 to FIG. 7, only the array substrate 100 and the opposing substrate 200 in the structure shown in FIG. 1 are shown, and the liquid crystal layer 300 between the array substrate 100 and the opposing substrate 200 is omitted.

Figure 3:
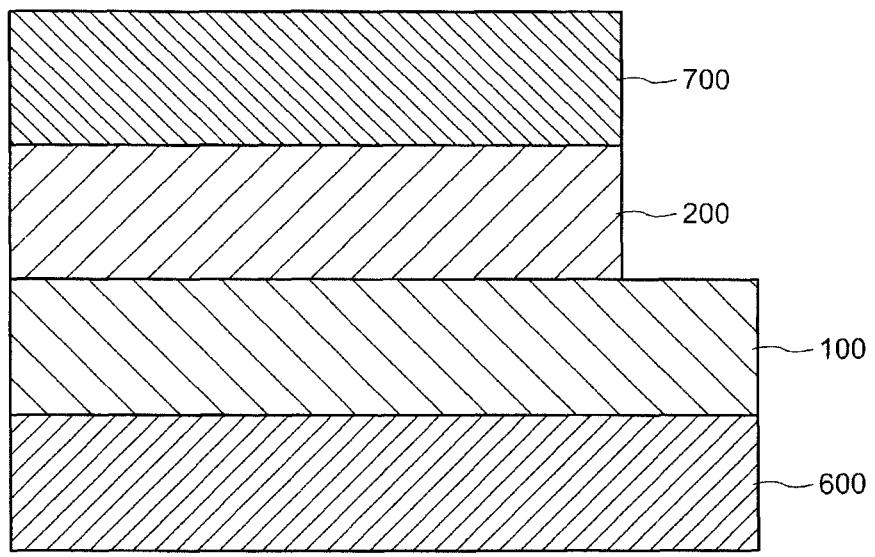
FIG. 3 is a diagram showing a manufacturing method of a liquid crystal display device related to one embodiment of the present invention.

As is shown in FIG. 3, the array substrate 100 formed on a first glass substrate 600 and the opposing substrate 200 formed on a second glass substrate 700 are bonded together. The array substrate 100 and the opposing substrate 200 are bonded together by a sealant arranged along the periphery of the array substrate 100 or the opposing substrate 200. In addition, the liquid crystal layer 300 of FIG. 1 is filled in a region surrounded by the array substrate 100, the opposing substrate 200 and the sealing material.

In the state shown in FIG. 3, the first resin substrate 110 of the array substrate 100 and the first glass substrate 600 are in contact with each other. Similarly, the second resin substrate 210 of the opposing substrate 200 and the second glass substrate 700 are in contact with each other. Although tensile stress is generated in the first resin substrate 110, since the first resin substrate 110 is bonded to the first glass substrate 600, the change in shape of the array substrate 100 is suppressed by the rigidity of the first glass substrate 600. That is, the array substrate 100 is supported by the first glass substrate 600. Similarly, although tensile stress is generated in the second resin substrate 210, since the second resin substrate 210 is bonded to the second glass substrate 700, the change in shape of the opposing substrate 200 is suppressed by the rigidity of the second glass substrate 700. That is, the opposing substrate 200 is supported by the second glass substrate 700.

Figure 4:
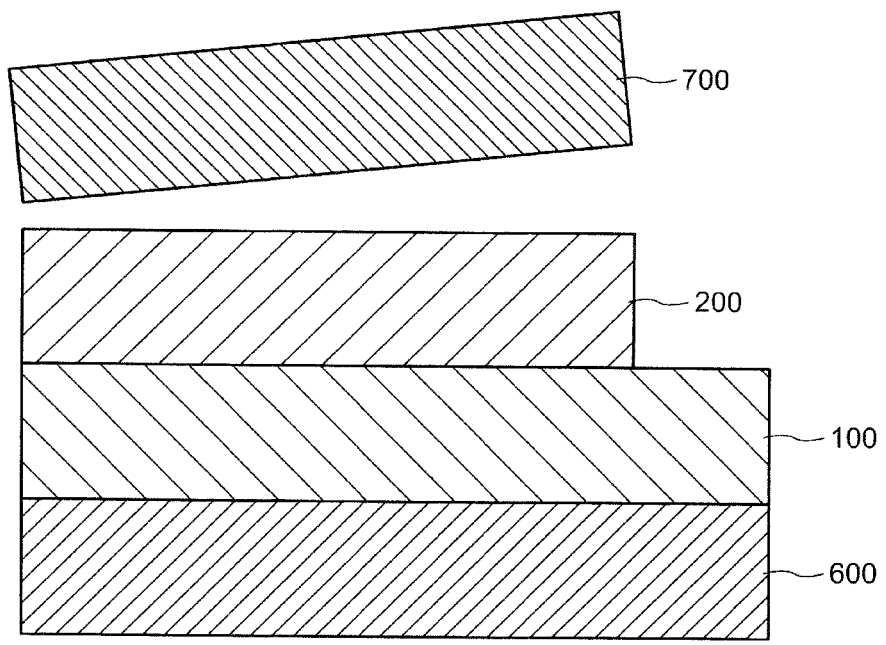
FIG. 4 is a diagram showing a manufacturing method of a liquid crystal display device related to one embodiment of the present invention.

As is shown in FIG. 4, the second glass substrate 700 is peeled from the opposing substrate 200 by irradiating the second glass substrate 700 with a laser from the opposite side of the opposing substrate 200 with respect to the second glass substrate 700.

Figure 5:
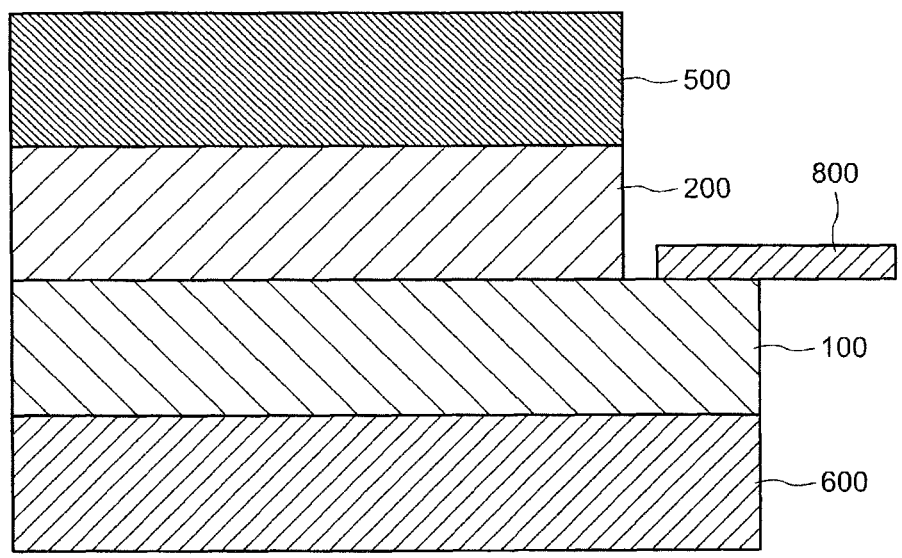
FIG. 5 is a diagram showing a manufacturing method of a liquid crystal display device related to one embodiment of the present invention.

As is shown in FIG. 5, the second polarization member 500 is attached to the opposing substrate 200. A terminal part connected to the circuit of the array substrate 100 is arranged in a region where the array substrate 100 is exposed from the opposing substrate 200. An FPC 800 is connected to this terminal part.

Figure 6:
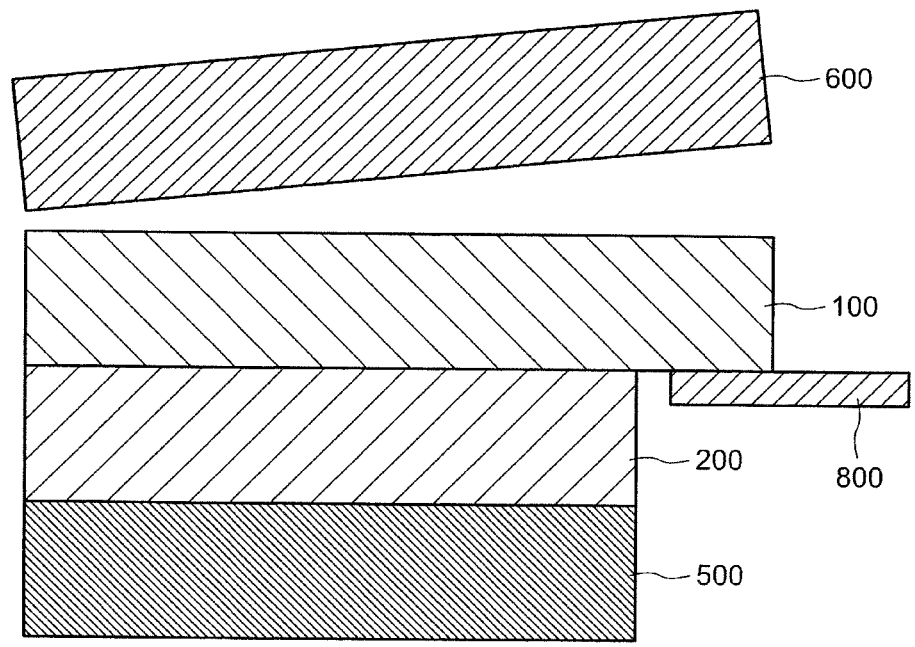
FIG. 6 is a diagram showing a manufacturing method of a liquid crystal display device related to one embodiment of the present invention.

As is shown in FIG. 6, the first glass substrate 600 is peeled from the array substrate 100 by irradiating the first glass substrate 600 with a laser from the opposite side of the array substrate 100 with respect to the first glass substrate 600. Furthermore, the top and bottom are reversed in FIG. 6 and FIG. 5. When the difference between the internal stress of the array substrate 100 and the internal stress of the opposing substrate 200 is large, for example, because of expansion or contraction of the opposing substrate 200, appearance defects such as wrinkles and distortions occur in the display device 10 after the first glass substrate 600 and the second glass substrate 700 are peeled from the array substrate 100 and the opposing substrate 200. However, in the present embodiment, since the difference between the internal stress of the array substrate 100 and the internal stress of the opposing substrate 200 is reduced by the first inorganic insulating layer 120 and the second inorganic insulating layer 220 as described above, appearance defects such as wrinkles and distortions are suppressed.

Figure 7:
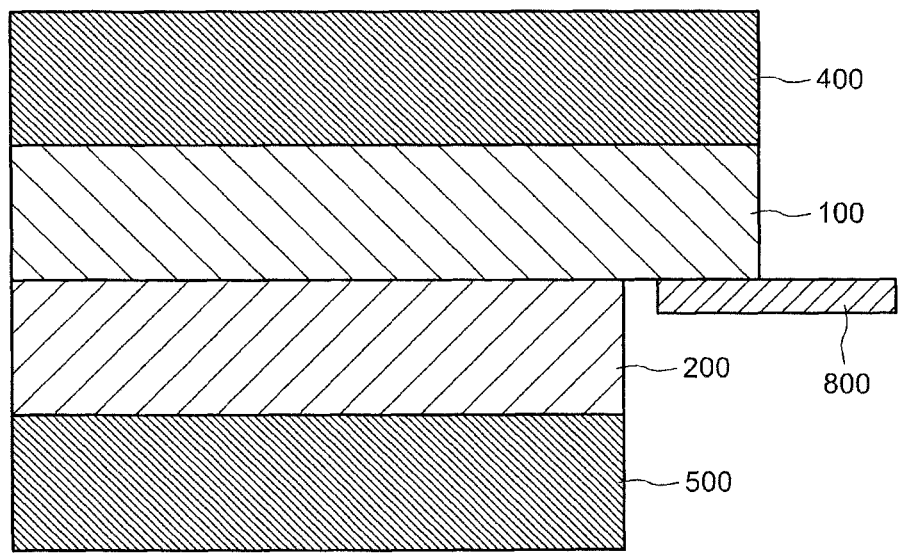
FIG. 7 is a diagram showing a manufacturing method of a liquid crystal display device related to one embodiment of the present invention.

As is shown in FIG. 7, the first polarization member 400 is attached to the array substrate 100. The display device 10 shown in FIG. 1 is manufactured by the manufacturing method described above. In FIG. 1, the FPC 800 shown in FIG. 3 to FIG. 7 is omitted.

Second Embodiment

Figure 8:
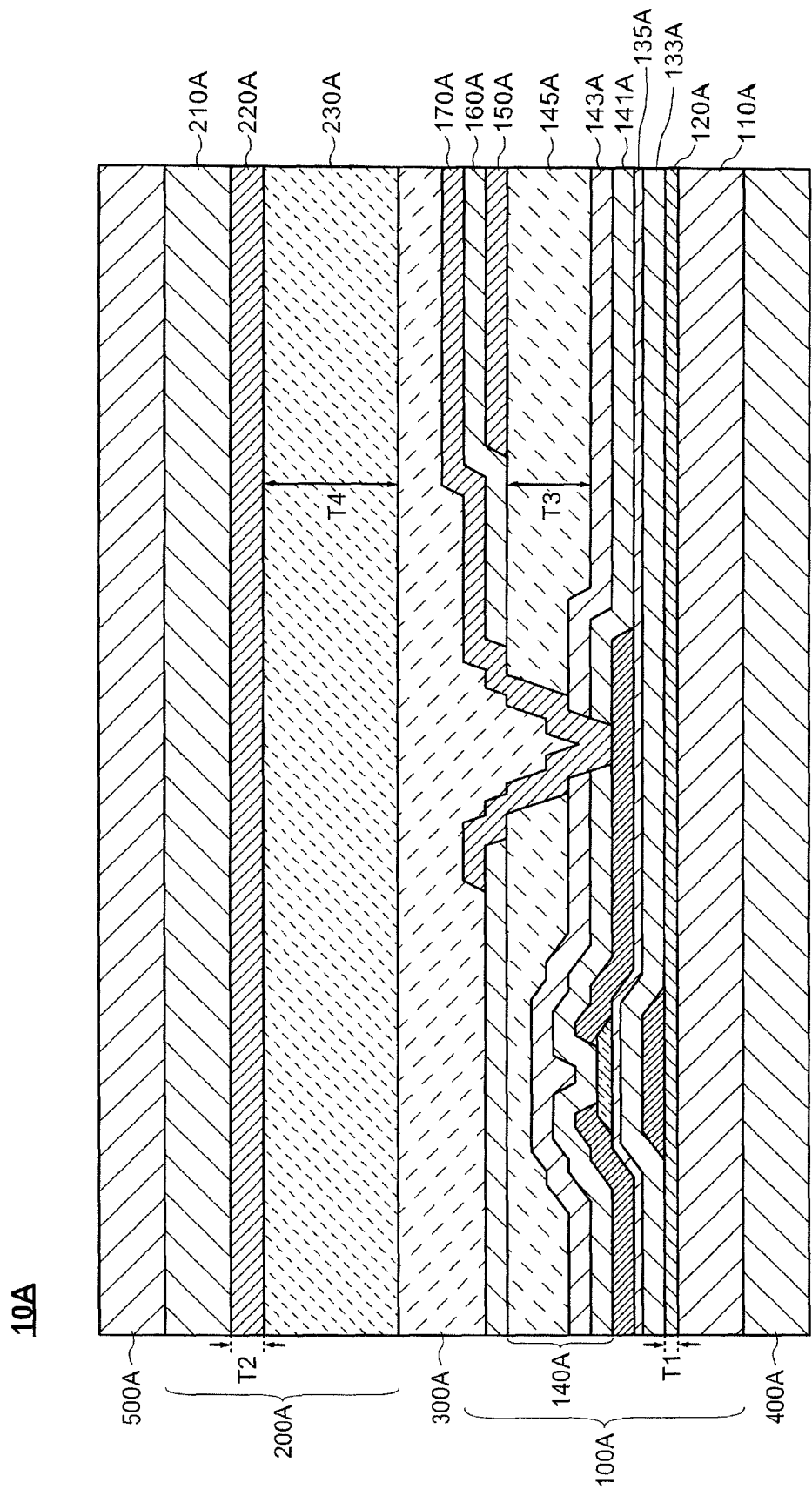
FIG. 8 is a diagram showing a cross-sectional structure of a liquid crystal display device related to one embodiment of the present invention.
Figure 11:
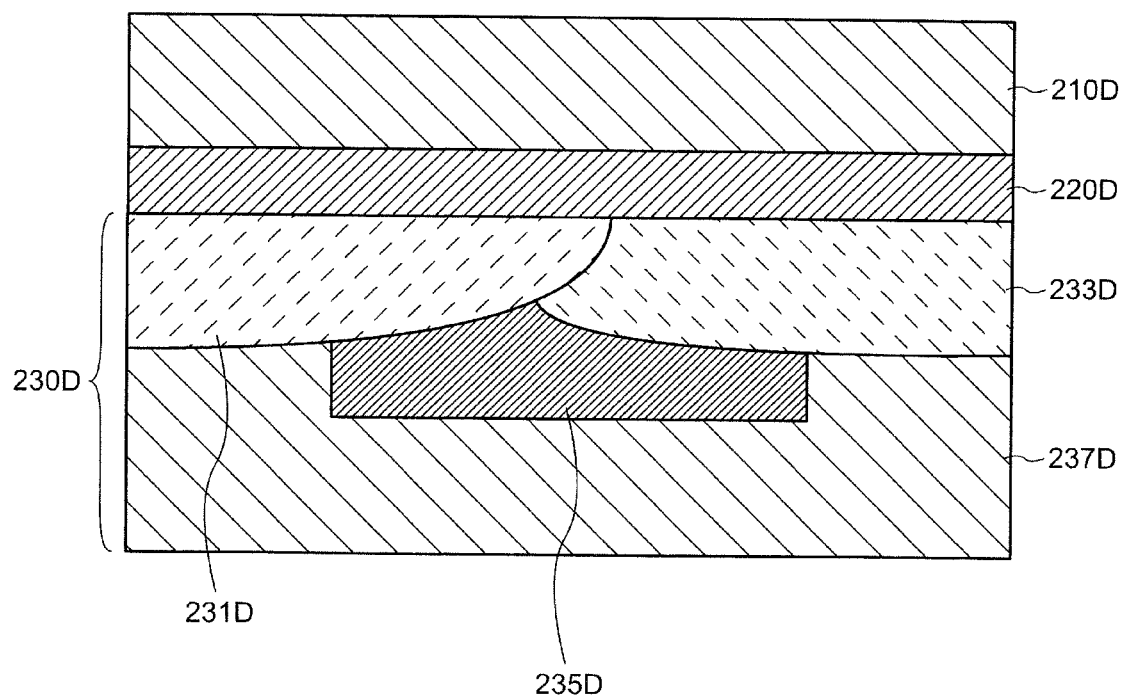
FIG. 11 is a diagram showing a cross-sectional structure of an opposing substrate side in a liquid crystal display device related to one embodiment of the present invention.

An outline of a display device 10A according to the second embodiment is explained while referring to FIG. 8. The display device 10A shown in FIG. 8 is similar to the display device 10 shown in FIG. 1 except that in the display device 10A, the thickness T2 of the second inorganic insulating layer 220A is larger than the thickness T1 of the first inorganic insulating layer 120A, and the thickness T4 of the second organic insulating layer 230A is larger than the thickness T3 of the first organic insulating layer 145A. Generally, as is shown in FIG. 11 described herein, the opposing substrate 200A includes a color filter 233D and an overcoat layer 237D as an organic insulating layer (see FIG. 11). Therefore, the second organic insulating layer 230A (T4) is often thicker than the first organic insulating layer 145A (T3).

As is described above, the thickness T3 of the first organic insulating layer 145A between the first inorganic insulating layer 120A and the liquid crystal layer 300A affects the internal stress of the array substrate 100A. The thickness T4 of the second organic insulating layer 230A between the second inorganic insulating layer 220A and the liquid crystal layer 300A affects the internal stress of the opposing substrate 200A. Therefore, when the thickness T4 of the second organic insulating layer 230A is larger than the thickness T3 of the first organic insulating layer 145A, the thickness T2 of the second inorganic insulating layer 220A is larger than the thickness T1 of the first inorganic insulating layer 120A, thereby it is possible to reduce the difference between the internal stress of the array substrate 100A and the internal stress of the opposing substrate 200A.

Third Embodiment

Figure 9:
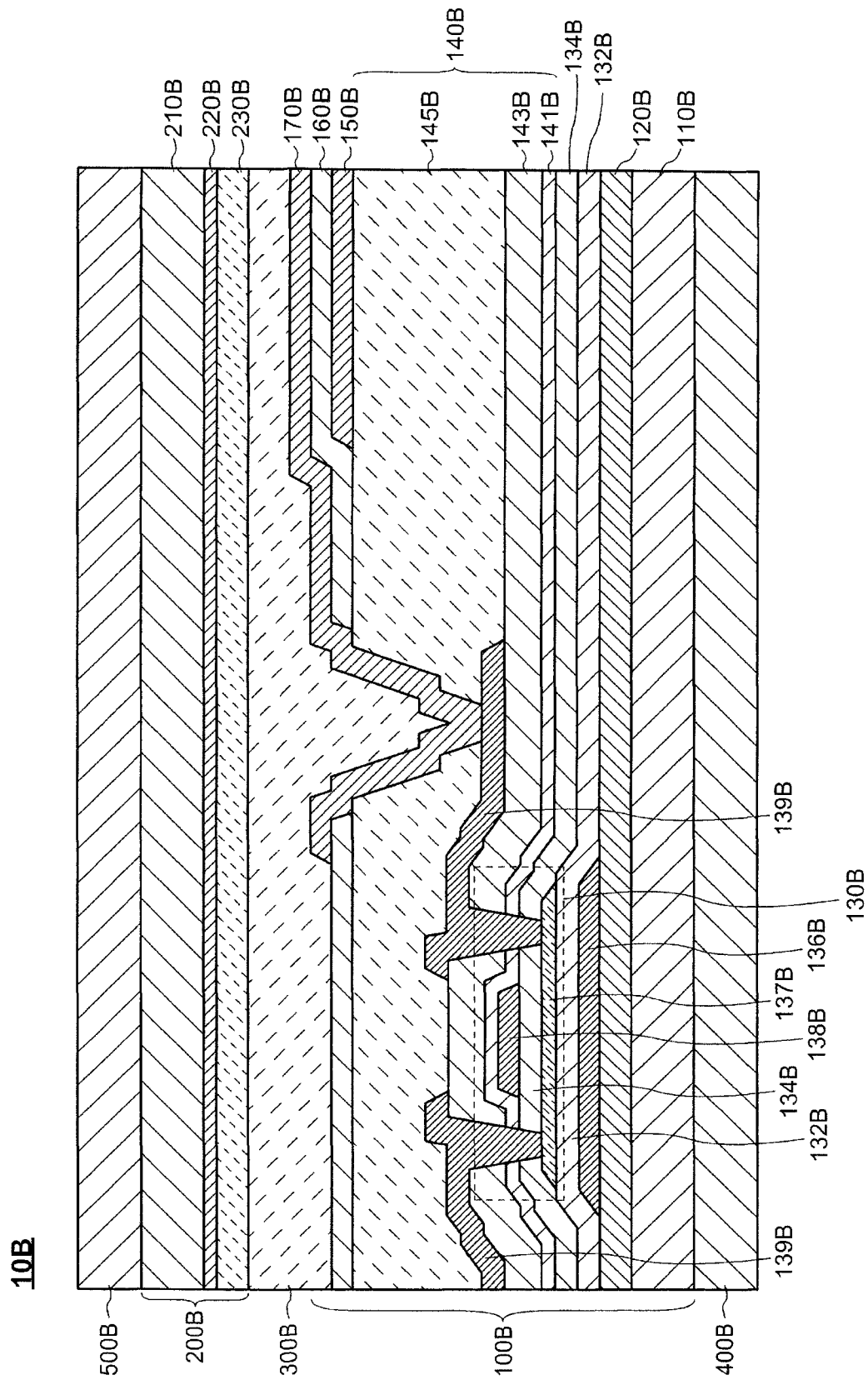
FIG. 9 is a diagram showing a cross-sectional structure of a liquid crystal display device related to one embodiment of the present invention.

An outline of a display device 10B according to the third embodiment is explained using FIG. 9. The display device 10B shown in FIG. 9 is similar to the display device 10 shown in FIG. 1 except that while the transistor 130 of the display device 10 is a bottom gate type transistor, the transistor 130B of the display device 10B is a top gate type transistor, and a light shielding layer 136B is arranged under the transistor 130B.

As is shown in FIG. 9, the transistor 130B is a top gate transistor in which a gate electrode 138B is arranged above the semiconductor layer 137B. The light shielding layer 136B is arranged under the semiconductor layer 137B. An inorganic insulating layer 132B is arranged between the semiconductor layer 137B and the light shielding layer 136B. The first inorganic insulating layer 120B is arranged between the light shielding layer 136B and the first resin substrate 110B. A gate insulating layer 1348 is arranged between the semiconductor layer 137B and the gate electrode 138B. The light shielding layer 136B suppresses light from entering the semiconductor layer 137B from below the semiconductor layer 137B. The light shielding layer 136B may be formed from a metal or a light shielding resin. In the case where a metal is used as the light shielding layer 136B, the light shielding layer 136B may have a function as an auxiliary gate electrode.

In the case when a metal is used as the light shielding layer 136B in the structure shown in FIG. 9, the plurality of wiring layers included in the array substrate 100B includes the gate electrode 138B, the source/drain electrode 1398, the common electrode 1508, the pixel electrode 1708 and the light shielding layer 136B. That is, in the present embodiment, the metal layer under the semiconductor layer 137B corresponds to the light shielding layer 136B. Similarly, in the present embodiment, the wiring layer closest to the first resin substrate 1108 among the plurality of wiring layers corresponds to the light shielding layer 136B. In other words, the light shielding layer 136B is a wiring layer between the first resin substrate 110B and the transistor 130B.

As is described above, according to the display device 10B of the third embodiment, as in the first embodiment, the difference between the internal stress of the array substrate 100B and the internal stress of the opposing substrate 200B can be reduced. As a result, appearance defects such as wrinkles and distortions of the display device 10B can be suppressed.

Fourth Embodiment

Figure 10:
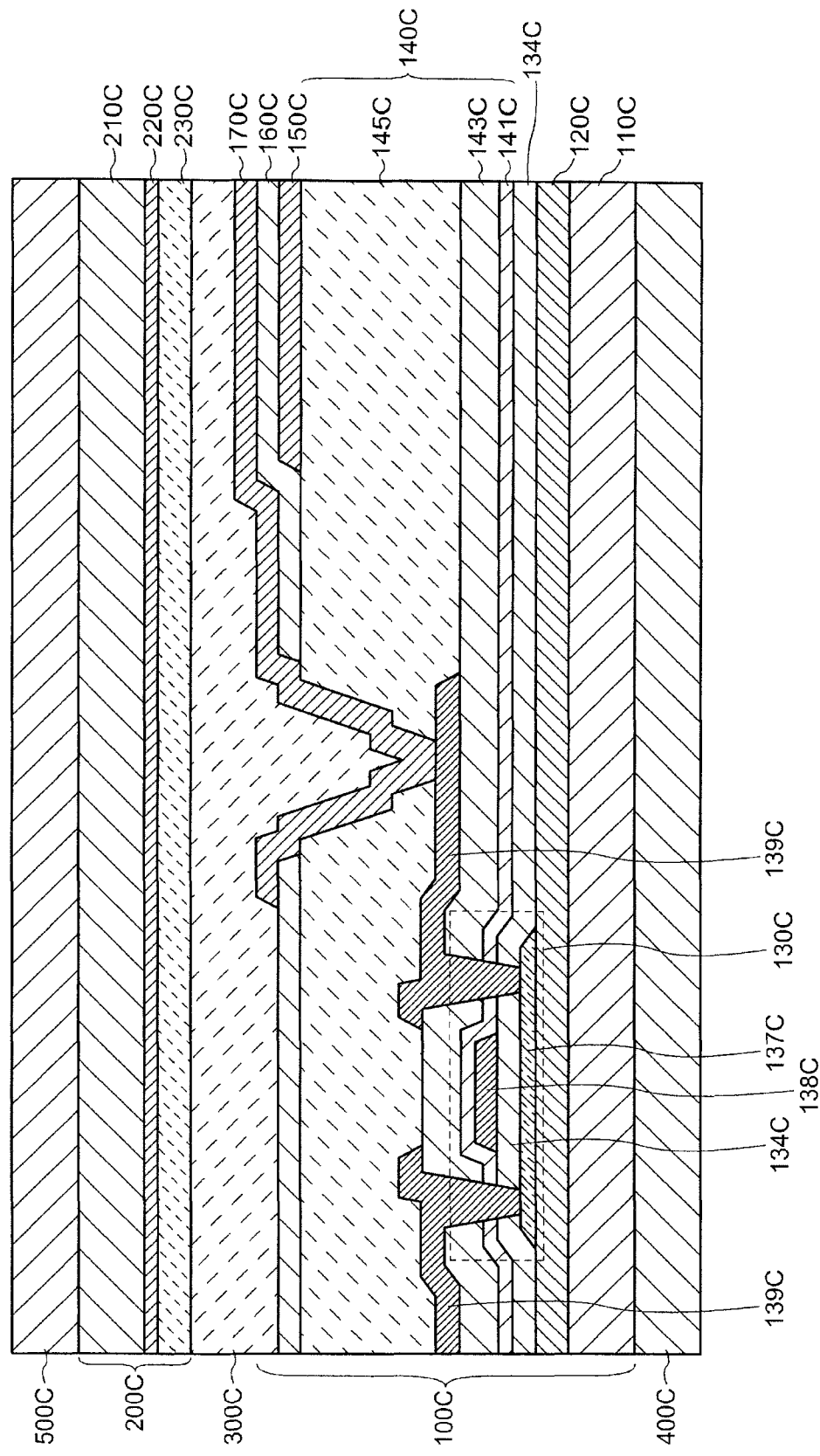
FIG. 10 is a diagram showing a cross-sectional structure of a liquid crystal display device related to one embodiment of the present invention.

An outline of a display device 100 according to the fourth embodiment is explained using FIG. 10. The display device 100 shown in FIG. 10 is similar to the display device 10B shown in FIG. 9, except that the display device 10B is arranged with the light shielding layer 136B under the transistor 130B, whereas the display device 100 is not arranged with a light shielding layer. In the case of the structure shown in FIG. 10, it can be said that the first inorganic insulating layer 120C is between the semiconductor layer 137C and the first resin substrate 110C.

As is described above, even with the display device 100 according to the fourth embodiment, it is possible to obtain the same effects as those of the display device 10B according to the third embodiment.

Fifth Embodiment

An outline of an opposing substrate 200D of the display device 10D according to the fifth embodiment is explained using FIG. 11. In the present embodiment, a detailed structure of the second inorganic insulating layer 220D and the second organic insulating layer 230D between adjacent pixels of the display device 10D is explained. As is shown in FIG. 11, the opposing substrate 200D has a second resin substrate 210D, a second inorganic insulating layer 220D and a second organic insulating layer 230D. The second organic insulating layer 230D includes a first color filter 231D, a second color filter 233D, a light shielding layer 235D and an overcoat layer 237D. The second inorganic insulating layer 220D may have a stacked structure as is shown in FIG. 2 or a single layer structure. In the following explanation the first color filter 231D and the second color filter 233D are collectively referred to as a color filter layer unless otherwise distinguished from each other.

A color filter layer is arranged under the second inorganic insulating layer 220D. The first color filter 231D and the second color filter 233D are color filters of different colors and are arranged corresponding to the display colors of respective pixels. The first color filter 231D and the second color filter 233D partially overlap each other at their boundary. The light shielding layer 235D is arranged corresponding to a region where two color filters overlap each other. The overcoat layer 237D is arranged under the color filter layer and the light shielding layer 235D. Considering the structure shown in FIG. 1, the light shielding layer 235D is arranged between the color filter layer and the liquid crystal layer 300D.

Light incident on the opposing substrate 200D from the second resin substrate 210D side is reflected by the light shielding layer 235D. In particular, when the second inorganic insulating layer 220D has a stacked structure in order to improve barrier properties, light interference occurs in each layer of the second inorganic insulating layer 220D. Considering the fact that the reflection angle of light at each wavelength is changed by this interference effect and that a part of external light is reflected by the light shielding layer 235D, the reflected light may be colored and visually recognized. However, as is shown in FIG. 11, since the color filter layer is arranged between the second inorganic insulating layer 220D and the light shielding layer 235D, it is possible for light to be absorbed by the color filter layer so that reflection of light is suppressed. That is, it is possible to achieve both high barrier properties by the second inorganic insulating layer 220D and suppression of deterioration of visibility due to external light reflection.

Sixth Embodiment

Figure 12:
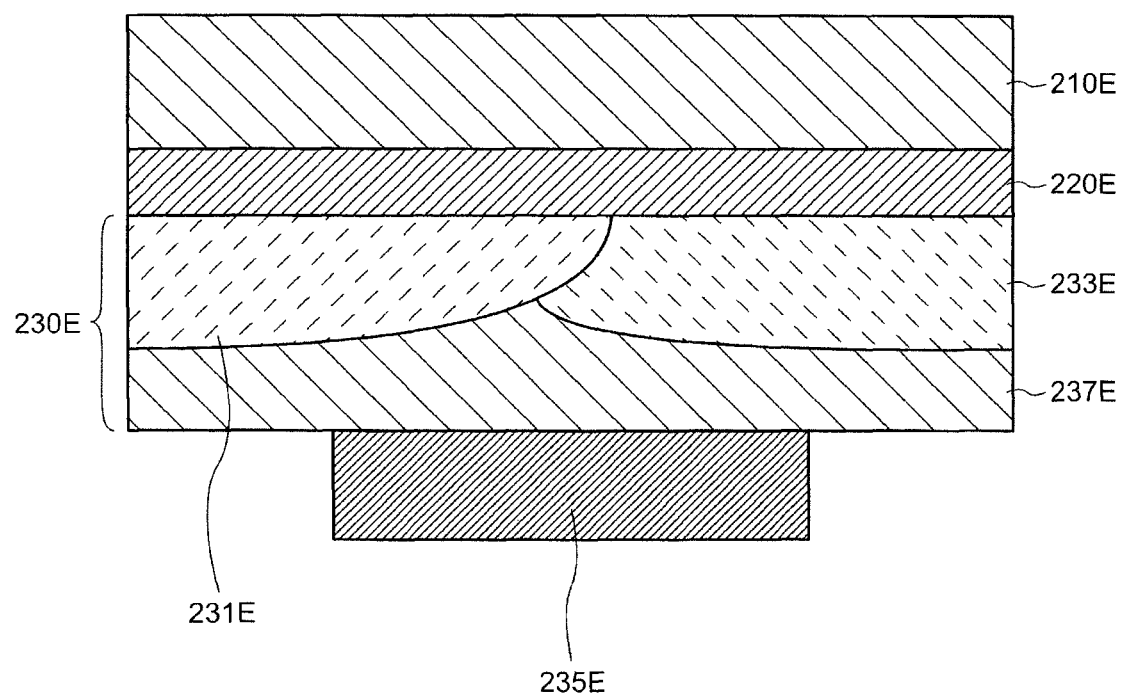
FIG. 12 is a diagram showing a cross-sectional structure of an opposing substrate side in a liquid crystal display device related to one embodiment of the present invention.

An overview of an opposing substrate 200E of a display device 10E according to the sixth embodiment is explained using FIG. 12. The opposing substrate 200E of the display device 10E shown in FIG. 12 is similar to the opposing substrate 200D of the display device 10D shown in FIG. 11 except that in the opposing substrate 200E, the light shielding layer 235E is arranged under the overcoat layer 237E. In the case of the structure shown in FIG. 12, it can be said that the light shielding layer 235E is between the overcoat layer 237E and the liquid crystal layer 300E.

According to the structure of the opposing substrate 200E of the present embodiment, it is possible to achieve both high barrier properties and suppression of light reflection similar to the opposing substrate 200D of the fifth embodiment.

Furthermore, the present invention is not limited to the embodiments described above and can be appropriately changed without departing from the concept of the present invention.

What is claimed is:

1. A display device comprising:
   a first resin substrate having flexibility;
   a second resin substrate having flexibility and facing the first resin substrate;
   an electro-optical layer between the first resin substrate and the second resin substrate;
   a semiconductor layer included in a transistor between the first resin substrate and the electro-optical layer;
   a plurality of wiring layers between the first resin substrate and the electro-optical layer, the plurality of wiring layers including a metal layer below the semiconductor layer;
   a first inorganic insulating layer between the metal layer and the first resin substrate; and
   a second inorganic insulating layer arranged in the second resin substrate between the electro-optical layer and the second resin substrate, a thickness of the second inorganic insulating layer being different from a thickness of the first inorganic insulating layer,
   wherein
   the second inorganic insulating layer includes a first insulating film, a second insulating film, a third insulating film, and a fourth insulating film,
   the first insulating film is in contact with the second insulating film,
   a main material of the third insulating film is a same as a main material of the first insulating film, and a main material of the fourth insulating film is a same as a main material of the second insulating film, and
   the first insulating film, the second insulating film, the third insulating film, and the fourth insulating film are stacked in this order.

2. The display device according to claim 1, wherein a thickness of the first insulating film is different from a thickness of the second insulating film.

3. The display device according to claim 1, wherein a main material of the first insulating film is different from a main material of the second insulating film.

4. The display device according to claim 1, further comprising:
   one or more third inorganic insulating layers between the metal layer and a wiring layer closest to the electro-optical layer among a plurality of wiring layers;
   wherein
   a density of the first inorganic insulating layer is higher than a density of the third inorganic insulating layer.

5. The display device according to claim 1, further comprising:
   a first organic insulating layer between the first inorganic insulating layer and the electro-optical layer; and
   a second organic insulating layer between the second inorganic insulating layer and the electro-optical layer;

wherein
the first organic insulating layer is thicker than the second organic insulating layer in the case where the first inorganic insulating layer is thicker than the second inorganic insulating layer, and
the second organic insulating layer is thicker than the first organic insulating layer in the case where the second inorganic insulating layer is thicker than the first inorganic insulating layer.

6. The display device according to claim 5, wherein the second organic insulating layer includes a color filter layer and a light shielding layer, and the light shielding layer is between the color filter layer and the electro-optical layer.

7. The display device according to claim 6, wherein the second organic insulating layer includes an overcoat layer covering the color filter layer, and the light shielding layer is between the overcoat layer and the electro-optical layer.

8. The display device according to claim 5, wherein the second inorganic insulating layer is a stacked layer.

9. The display device according to claim 1, further comprising:
one or more third inorganic insulating layers between the metal layer and a wiring layer closest to the electro-optical layer among a plurality of wiring layers;
a first organic insulating layer between the first inorganic insulating layer and the electro-optical layer; and
a second organic insulating layer between the second inorganic insulating layer and the electro-optical layer;
wherein
a thickness of the first insulating film is different from a thickness of the second insulating film;
a main material of the first insulating film is different from a main material of the second insulating film;
the first organic insulating layer is thicker than the second organic insulating layer in the case where the first inorganic insulating layer is thicker than the second inorganic insulating layer, and
the second organic insulating layer is thicker than the first organic insulating layer in the case where the second inorganic insulating layer is thicker than the first inorganic insulating layer.

* * * * *